United States Patent [19]

Abulkasim ogly Kerimov et al.

[11] 4,250,852
[45] Feb. 17, 1981

[54] FUEL INJECTION INTERNAL COMBUSTION ENGINE WITH PRECHAMBER TORCH IGNITION

[76] Inventors: Niyazi Abulkasim ogly Kerimov, ulitsa Chapaeva, 47a, kv. 6; Rafik Israfil ogly Mekhtiev, ulitsa Vneshne-koltsevaya, 10, kv. 169, both of Baku; Lev A. Gussak, Leninsky prospekt, 57, kv. 86, Moscow; Konstantin M. Maskenskov, ploschad M. Gorkogo, 5/76, kv. 33; Garri V. Evart, prospekt Zhdanova, 32, kv. 65, both of Gorky; Malik Akhmed ogly Talybov, ulitsa Pishavari, 31, kv. 19; Ruslan D. Tagiev, ulitsa Chapaeva, 54, kv. 37, both of Baku, all of U.S.S.R.; Nikolai G. Mozokhin, deceased, late of Gorky, U.S.S.R.; by Valentina I. Zubalya, administrator, ulitsa Avtomobilnaya, 16, kv. 36, Gorky, U.S.S.R.

[21] Appl. No.: 949,024

[22] Filed: Oct. 6, 1978

Related U.S. Application Data

[63] Continuation of Ser. No. 703,507, Jul. 8, 1976, abandoned.

[51] Int. Cl.² ..................... F02B 19/00; F02B 17/00
[52] U.S. Cl. .................................. 123/260; 123/260
[58] Field of Search ............ 123/32 SP, 32 ST, 32 K, 123/32 L, 191 S, 191 SP, 75 B

[56] References Cited

U.S. PATENT DOCUMENTS

| 2,758,576 | 8/1956 | Schlamann | 123/32 SP |
| 2,979,044 | 4/1961 | Yamada et al. | 123/32 K |
| 3,776,212 | 12/1973 | Karlowitz | 123/32 SP |
| 3,799,140 | 3/1974 | Vogelsang et al. | 123/32 SP |
| 3,830,205 | 8/1974 | Date et al. | 123/32 ST |
| 3,890,942 | 6/1975 | Date et al. | 123/32 SP |
| 4,009,692 | 3/1977 | Sakai et al. | 123/32 SP |
| 4,036,202 | 7/1977 | Weslake | 123/32 ST |
| 4,050,422 | 9/1977 | Noguchi et al. | 123/32 SP |

*Primary Examiner*—P. S. Lall
*Attorney, Agent, or Firm*—Haseltine, Lake & Waters

[57] ABSTRACT

A fuel-injection engine with prechamber-torch ignition is of particular advantage in vehicular transport. In this engine, an injector nozzle and a nozzle connecting the precombustion chamber with the combustion chamber are arranged opposite to each other, a channel providing for additional communication between the precombustion chamber and the combustion chamber being made in a wall of the precombustion chamber near the injector nozzle. The distance between the injector nozzle and the precombustion chamber nozzle is such, that during injection a jet of fuel touches the walls of the precombustion chamber and ejects the contents thereof into the combustion chamber, wherein the volume of the fuel jet in the precombustion chamber constituting 0.05–0.25 of the volume of said chamber. Such an embodiment of the engine permits scavenging of the precombustion chamber and removal of exhaust gases from said chamber.

4 Claims, 8 Drawing Figures

FUEL INJECTION INTERNAL COMBUSTION ENGINE WITH PRECHAMBER TORCH IGNITION

This is a continuation of application Ser. No. 703,507 filed July 8, 1976, now abandoned.

The present invention relates to internal-combustion engines, and more specifically, to fuel-injection internal-combustion engines with prechamber-torch ignition.

Internal-combustion engines according to the present invention are of particular advantage in vehicular transport.

Known in the art are fuel-injection internal-combustion engines with prechamber-torch ignition, wherein the precombustion chamber nozzle, ensuring communication between said chamber and the combustion chamber, and an injector nozzle, fitted in the precombustion chamber, are arranged opposite to each other. In the precombustion chamber, there is also fitted a spark plug for ignition of a fuel-air mixture formed therein.

In said engines, for the formation of a fuel-air mixture in the precombustion chamber, air displaced from the cylinder by the upward stroke of the piston is fed into the chamber. Since in these engines the precombustion chamber is not scavenged, all gases burnt during the previous cycle remain in the precombustion chamber.

Thus, fuel injection and introduction of air into the precombustion chamber result in formation in said chamber of a fuel-air mixture contaminated with burnt gases. The fuel-air mixture will hereinafter be referred to as "precombustion chamber mixture".

To provide for a required composition of the precombustion chamber mixture, the precombustion chamber in the prior art engines is made relatively large (over 30% of the total volume of the combustion chamber, determined as the sum total of the volumes of the precombustion chamber and the combustion chamber). Such a large volume of the precombustion chamber causes an excessive increase in the pressure difference between the precombustion chamber and the combustion chamber in the process of fuel combustion, resulting in a considerable increase in the discharge rate and range of the precombustion chamber torch of burning gases, hence, in substantial thermal and gas-dynamic losses. Said features, in their turn, being about impermissibly "heavy" operation of the engine at maximum loads, resulting in an increased engine noise and a substantially shorter service life. Besides, large volume of the precombustion chamber results in poorer stability of the operating cycle and, consequently, lower fuel economy of the engine. The instability of the operating cycle is, to some extent, due to the precombustion chamber being contaminated with residual gases.

In the prior art engines, under various operating conditions, the quantity of fuel in the precombustion chamber varies within a broad range, whereas the quantity of air entering the chamber is practically invariable, which results in the composition of the precombustion chamber mixture varying within a broad range, while maximum efficiency of the operating cycle can be achieved only provided the composition of the mixture in all operating conditions is maintained within the range corresponding to the excess air ratio $\alpha = 0.5 + 0.9$ (excess air ratio $\alpha$ is the ratio between the actual quantity of air in the fuel-air mixture and a quantity of air theoretically required for complete combustion of fuel).

There are also known internal-combustion engines with prechamber-torch ignition, in which the precombustion chamber is of a relatively small volume (up to 12% of the total volume of the combustion chamber) and in which provision is made for scavenging the precombustion chamber through the use of a scavenging system with an inlet valve arranged in the precombustion chamber.

The scavenging system complicates the structure of the engine and does not ensure maintaining the composition of the precombustion chamber mixture within the required limits over a broad range of operating conditions of the engine. When the engine operates at maximum loads and at low speeds, the pressure difference between the precombustion chamber and gas pipe is low. The gas pipe features a considerable gas-dynamic resistance resulting from its length and bends. This limits the inflow of air (or fuel-air mixture) into the precombustion chamber in an amount required for proper scavenging of the precombustion chamber to remove residual gases, thereby adversely affecting the process of ignition of the precombustion chamber mixture and stability of operation of a precombustion-chamber engine. When the engine operates at low loads and in no-load conditions where deep throttling of the inlet air is required, the pressure difference between the precombustion volume and the gas pipe sharply increases. Said feature considerably increases the flow of the precombustion chamber mixture through the precombustion chamber into the combustion chamber and provides for excessive scavenging of the precombustion chamber, as a result of which the plug electrodes are flooded with a rich fuel-air mixture and the process of igniting the precombustion chamber mixture is disrupted again.

Besides, wave effects appearing in the gas pipeo of said scavenging system also affect the stability of supply of the fuel-air mixture to the precombustion chamber.

In the above-described engines, owing over-enrichment of the mixture in the precombustion chamber, especially in the area of high loads, it is impossible to provide for a fuel feed into the combustion chamber at a later stage during the compression stroke. This, in turn, makes it impossible to use high compression ratio ($E = 11-13$) due to detonation combustion of the fuel-air mixture, thus ruling out the possibility of increasing the efficiency of the engine and its operation on various fuels.

Besides, in the above engines, it is impossible to provide for a stratified pattern of the fuel-air mixture along the torch of burning gases flowing out of the precombustion chamber and, consequently, for a stratified combustion of the fuel, which, in turn, results in an increased concentration of toxic components in the exhaust gases.

It is an object of the present invention to provide a fuel-injection internal-combustion engine with pre-chamber-torch ignition, wherein the precombustion chamber is so arranged that, while being relatively small in volume, it would permit scavenging thereof and removal of exhaust gases therefrom.

Another object of the present invention is to provide an internal-combusion engne ensuring formation of a fuel-air mixture of optimal composition in the precombustion chamber thereof within the entire range of operating conditions of the engine.

Still another object of the invention is to improve the efficiency of the engine.

A further object of the invention is to minimize the toxicity of the exhaust gases.

Yet another object of the invention is to provide an engine operable on various fuels.

With these and other objects in view, the invention resides in that a fuel-injection internal-combustion engine with prechamber-torch ignition, wherein at least one precombustion chamber nozzle, ensuring communication between said chamber and a combustion chamber, and at least one injector nozzle, fitted in said precombustion chamber, are arranged opposite to each other, according to the invention, is provided with at least one channel ensuring additional communication between the combustion chamber and the precombustion chamber is near the injector nozzle, the distance between the injector nozzle to the nozzle of the precombustion chamber being such that during injection a jet of fuel enters the nozzle of the precombustion chamber, touching the internal surface thereof, the volume of the jet of fuel in the precombustion chamber constituting 0.05–0.025 of the volume of the precombustion chamber with the result that said channel serves for sucking the working medium from the combustion chamber into the precombustion chamber during fuel feed.

It is expedient that the cross-sectional area of the channel be substantially equal to that of the nozzle of the precombustion chamber.

The equality of the cross-sectional areas of the channel and the nozzle of the precombustion chamber ensures optimum scavenging of the precombustion chamber, removal of exhaust gases therefrom and obtaining optimum compositions of the fuel-air mixture in said chamber over the entire range of operating conditions of the engine.

It is also expedient to so position the outlet of the nozzle of the precombustion chamber that it should be overlapped by the piston crown at the moment when the piston is at the outer dead point.

Overlapping of the outlet of the nozzle of the precombustion chamber permits maintaining the energy of efflux of the precombustion chamber torch of burning gases at a sufficient level.

It has been found that the channel should preferably be positioned so that its end associated with the combustion chamber is overlapped by the piston crown at the moment when the piston is at the top dead center.

Overlapping of the end of the channel provides for stratified combustion of the fuel-air mixture in the combustion chamber, which results, in turn, in lower concentrations of such toxic components of exhaust gases as nitrogen oxides (NO), carbon monoxide (CO), and unburnt hydrocarbons (CH). The fuel-injection internal-combustion engine with prechamber-torch ignition, embodied according to the present invention, permits, in comparison with conventional (petrol) engines used in automobiles, increasing its power by 10–25%, reducing fuel consumption by 10–15% and reducing the exhaust gases toxicity 4 to 6-fold in normal operation, and, in comparison with diesel engines, the proposed engine permits the specific power to be increased by 20–30%

The invention will now be explained in greater detail with reference to specific embodiments thereof, taken in conjunction with the accompanying drawings, wherein.

Described in the specific examples that follow is a single cylinder of a multi-cylinder piston engine or a single section of a multi-section rotary-piston engine wherein all cylinders (or all sections) are identical, therefore, in the description that follows, whatever applies to one cylinder (section) is equally valid for the rest.

The internal-combustion piston engine comprises a cylinder I (FIG. 1) with a piston 2. The cylinser 1 is provided with a cylinder head 3 accommodating an intake valve 4 through which the cylinder 1 communicates with a gas pipe 5 for air to be supplied into said cylinder during the intake stroke. The head 3 also accommodates a precombustion chamber 6 and a combustion chamber 7.

Figure 1:
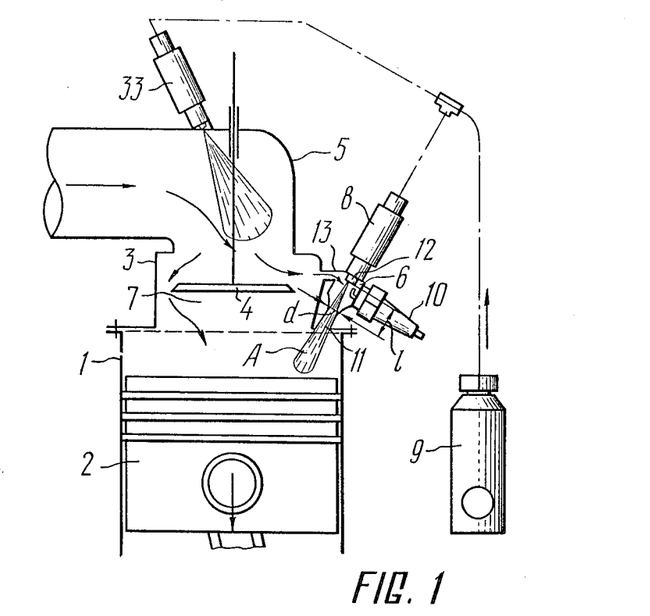
FIG. 1 shows schematically one cylinder of an engine with a precombustion chamber, a combustion chamber and an inlet gas pipe, according to the invention.

An injector 8 which is in communication with a fuel pump 9, as well as a spark plug 10 are arranged in the precombustion chamber 6. The precombustion chamber 6 is provided with a nozzle 11 connecting the chamber 6 with the combustion chamber 7. The nozzle 11 is so arranged in the precombustion chamber 6 that the direction thereof coincides with that of a fuel jet "A" flowing out of a nozzle 12 of the injector 8. Owing to such a direction of the fuel jet "A", the fuel passes from the precombustion chamber 6 to the combustion chamber 7 and is almost uniformly distributed in the combustion chamber. The nozzle 12 of the injector 8 is positioned at such a distance "1" from the nozzle 11 of the precombustion chamber 6 that during injection almost all of the fuel jet "A" enters the nozzle 11 of the precombustion chamber 6 without spraying and touches the inner surface of said nozzle 11.

The distance "1" is selected such that the volume $V_1$ of the fuel jet "A" in the precombustion chamber 6 constitutes 0.05 to 0.25 of the volume $V_2$ of the precombustion chamber 6, i.e. $V_1/V_2 = 0.05$ to $0.25$; $V_1 = \frac{1}{3} \pi d^2 l/4$, where d is the diameter of the nozzle 11 where the fuel jet just comes into contact.

In the precombustion chamber 6, near the nozzle 12 of the injector 8, there is provided a channel 13 ensuring additional communication between the precombustion chamber 6 and the combustion chamber 7. The channel 13 is intended for scavenging of the precombustion chamber 6, removal of exhaust gases of the previous cycle from said chamber and filling said chamber with air (or fuel-air mixture) from the combustion chamber 7. This is achieved owing to the fact, that while fuel is injected through the nozzle 11 of the precombustion chamber 6, the fuel jet ejects the exhaust gases from the precombustion chamber 6 into the combustion chamber 7 to produce a pressure difference between the chambers 6 and 7. As a result of said pressure difference, air (or fuel-air mixture, namely, working medium) is sucked from the combustion chamber 7 into the precombustion chamber 6.

The cross-sectional area of the channel 13 must be almost equal to the minimum cross-sectional area of the nozzle 11. Such a channel can provide for almost complete removal of exhaust gases from the precombustion chamber 6.

The exit cross section of the nozzle 11 of the precombustion chamber 6 is so arranged in a plane parallel to the crown of the piston 2 that when the latter is at the outer dead point, it overlaps said exit, whereby the energy of efflux of the torch of burning gases is maintained at a sufficient level.

In this embodiment, the volume of the precombustion chamber 6 is selected within the range of from 2 to 10% of the total volume of the combustion chamber, i.e. of the sum total of the volumes of the combustion chamber 7 and precombustion chamber 6, whereas the total clear cross section of the nozzle 11 of the precombustion chamber 6 and of the channel 13 should constitute from 0.03 to 0.1 $cm^2$ per 1 $cm^3$ of the volume of the precombustion chamber 6. Same parameters are recommended for other embodiments of the engine, following below.

According to another embodiment of the internal-combustion engine (FIGS. 2, 3), a channel 15 providing for additional communciation between a precombustion chamber 14 and a combustion chamber 16 is so arranged in the precombustion chamber 14 that its end associated with the combustion chamber 16 lies in a plane parallel to the piston head 2, while the injector 8 for supplying fuel and a nozzle 17 connecting the precombustion chamber 14 with the combustion chamber 16 are arranged coaxially in such a manner that the fuel jet "A" flowing out of the injector 8 is directed into the combustion chamber 16. Such a direction of the fuel jet "A" ensures a stratified pattern of the fuel-air mixture in the combustion chamber along the fuel jet.

Figure 2:
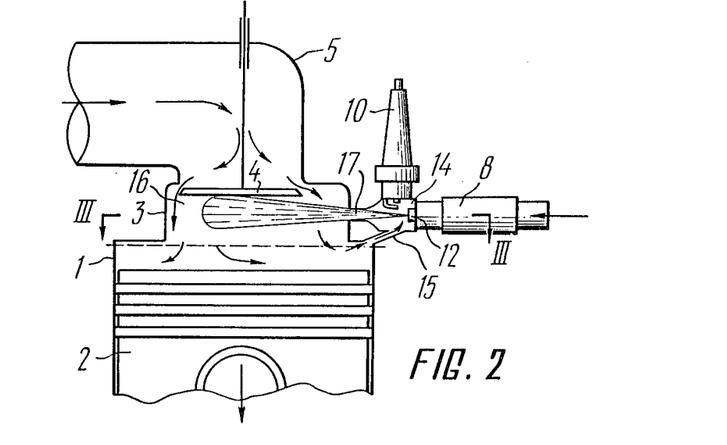
FIG. 2 shows another embodiment of the engine of FIG. 1.
Figure 3:
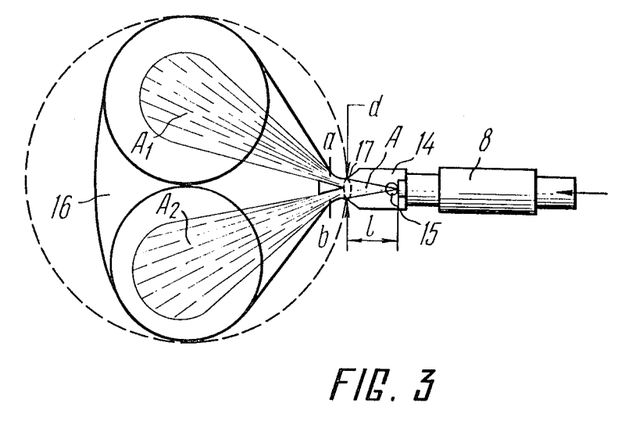
FIG. 3 is a view taken along line III—III of FIG. 2.

The nozzle 17 is provided with two outlet openings "a" and "b" arranged at an angle to each other. As a result, the fuel jet "A" is split into two jets "$A_1$" and "$A_2$", said feature permitting the air exchange in the combustion chamber to be more fully utilized during combustion of fuel.

The distance "l" between the inlet of the nozzle 17 of the precombustion chamber 14 and the outlet of the nozzle 12 of the injector 8 and the minimum diameter "d" of the nozzle 17 of the precombustion chamber 14 are selected similarly as in the previous embodiment.

The proposed internal-combustion engine, according to a further embodiment thereof (FIG. 4), comprises a cylinder 1 with a piston 18 in which a spherical combustion chamber 19 is made. An intake valve 21 and a precombustion chamber 22 are arranged in a head 20 of the cylinder 1. The injector 8 and a nozzle 23 of the precombustion chamber 22 are coaxially arranged in such a manner that the fuel jet "A" is directed tangentially to the spherical surface of the combustion chamber 19. A channel 24 wherethrough the precombustion chamber 22 communicates with the combustion chamber 19 is arranged near the nozzle 12 of the injector 8 tangentially to direction of the air swirl (indicated by arrows "B") occurring in the combustion chamber 19.

A fuel-injection rotary-piston engine with prechamber-torch ignition comprise a housing 25 (FIGS. 5, 6), accommodating a rotor 26. The housing 25 also accommodates a precombustion chamber 27 connected with a combustion chamber 28 via a nozzle 29 and a channel 30. The nozzle 29 and the injector 8 are arranged coaxially, the channel 30 being arranged near the nozzle 12 of the injector 8.

Figure 5:
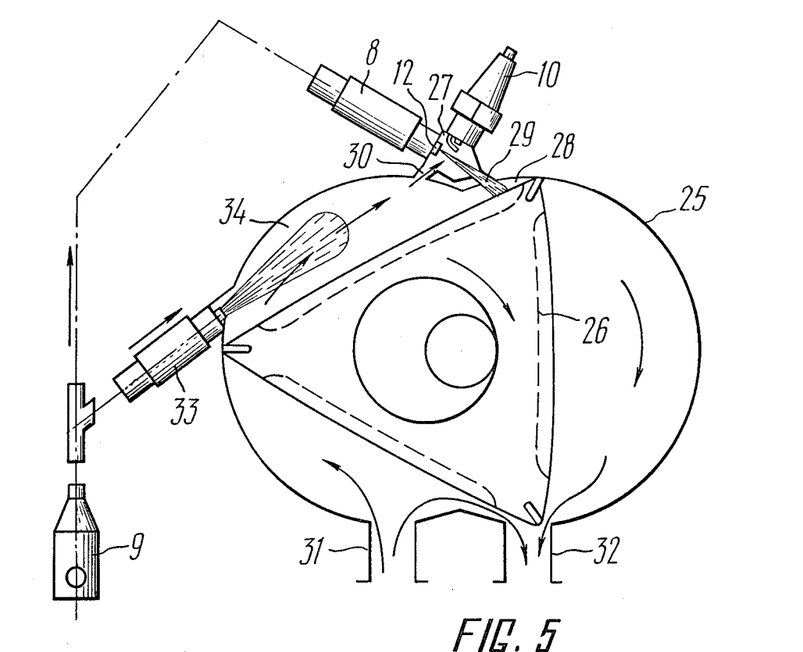
FIG. 5 shows schematically a rotary-piston engine with a precombustion chamber, according to the invention.
Figure 6:
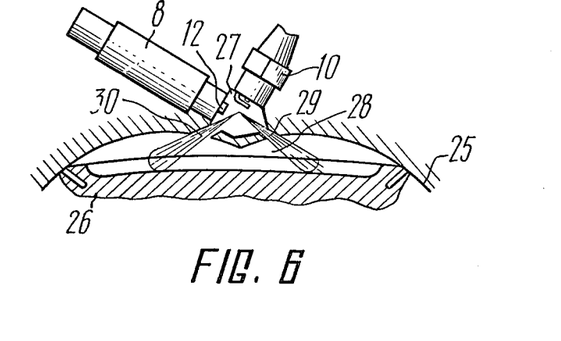
FIG. 6 shows the engine of FIG. 5, the position of the rotor being shown during combustion of the fuel-air mixture.

The distance between the outlet of the nozzle 12 of the injector 8 and that of the nozzle 29 of the precombustion chamber 27, as well as the minimum diameter of the nozzle 29 are selected similarly as those in the first embodiment of a piston engine.

The housing 25 accommodates a gas pipe 31 for supplying air into the engine and a gas pipe 32 for discharge of exhaust gases.

The internal-combustion engine according to the first embodiment thereof shown in FIG. 1 operates as follows.

FIG. 1 shows the intake stroke of the engine, when the charge (air or fuel-air mixture) through the open intake valve 4 passes into the cylinder 1 and fuel is supplied by the pump 9 to the injector 8. The fuel jet "A" from the nozzle 12 of the injector 8 passes via the precombustion chamber 6 and through the nozzle 11 into the cylinder 1, ejects the exhaust gases produced during the previous stroke from the precombustion chamber 6 and sucks the working medium from the combustion chamber 7 through the channel 13. Thus, the precombustion chamber is cleaned from burnt gases.

At the end of the fuel supply cycle, that portion of fuel which is injected last remains in the precombustion chamber 6 because of insignificant kinetic energy. Said portion of fuel is mixed with the air sucked into the precombustion chamber 6 and with the fuel-air mixture which, during the compression stroke, is displaced from the combustion chamber 7 into the precombustion chamber 6, forming thereby a rich precombustion chamber mixture having an excess air ratio $\alpha = 0.5 + 0.9$ in all operating conditions of the engine. At the end of the compression stroke, the spark plug 10 ignites the rich mixture in the precombustion chamber 6, and as it burns, chemically active products of incomplete combustion are formed. This results in higher pressure in the precombustion chamber 6 and in a pressure difference between the precombustion chamber 6 and the combustion chamber 7. Meanwhile, the outlet of the nozzle 11 is closed by the crown of the piston 2, said piston being at the outer dead point. Therefore, the chemically active precombustion chamber torch of products of incomplete combustion of the rich precombustion chamber mixture under the effect of a slight pressure difference flows out, mostly, through the channel 13 into the combustion chamber 7 and ignites the fuel-air mixture therein, at the same time intensifying the process of combustion thereof.

The fuel-air mixture in the combustion chamber 7 may vary in composition from best power mixture ($\alpha = 0.9 + 1.0$) to a very lean one ($\alpha \geq 2$) depending on load conditions of operation of the engine. This, in principle, regulates the power developed by the engine over the entire range of load variations, said control being achieved by changing the quantity of the injected fuel, while the quantity of air entering the cylinder 1 remains constant under given speed conditions of operation.

However, such regulation is effective within the range of loads from 100 to about 50% of the total power that is why all subsequent changes in the power, down to no-load operation, are attained by changing both, quantity and composition of the fuel-air mixture, i.e. a decrease in the quantity of the injected fuel is accompanied by throttling of the intake air.

At the same time, with a view to improving the operation of the engine through an enhanced carburation in the combustion chamber 7, a certain amount of fuel may be injected into the intake gas pipe 5 through an injector 33 (FIG. 1), fed from the same section of the fuel pump 9.

The internal-combustion engine according to another, preferred, embodiment thereof, shown in FIGS. 2 and 3 operates in a manner similar to that described in connection with the first embodiment. However, in this embodiment, during combustion of the rich fuel-air mixture in the precombustion chamber 14, the end of the channel 15, associated with the combustion chamber 16, is overlapped by the crown of the piston 2, said piston being at the outer dead point. As a result, the chemically active precombustion chamber torch flows out, mostly, through the outlet openings "a" and "b" of the nozzle 17 into the combustion chamber 16 wherein said torch ignites the fuel-air mixture arranged in a stratified manner along the precombustion chamber torch. This results in a stratified combustion of the fuel-air mixture in the combustion chamber 16, during which the combustion of the fuel-rich mixture, which burns first under conditions of deficiency in free oxygen ($O_2$) required for oxidation of nitrogen, is followed by that of a fuel-weak mixture which is on the periphery where the low combustion temperature does not promote formation of nitrogen oxides ($NO_x$). Besides, said stratified combustion causes a sharp decrease in the content in exhaust gases of such toxic components as carbon monoxide (CO) and unburnt hydrocarbons (CH).

Thus, the embodiment under consideration provides not only for high performance-economic factors but also for a sharp reduction in the toxicity of exhaust gases.

Figure 4:
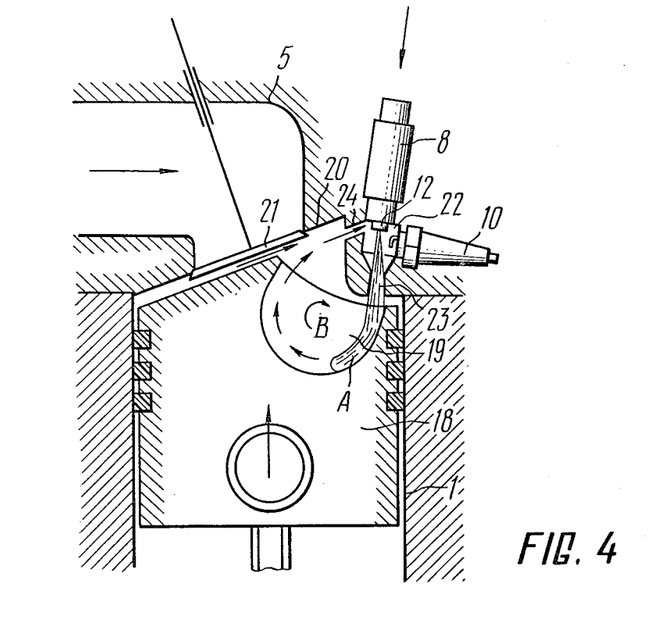
FIG. 4 shows a third embodiment of the engine of FIG. 1.

The internal-combustion engine according to a third embodiment thereof shown in FIG. 4 operates as follows. Fuel is supplied through the injector 8 during the compression stroke. Therewith, the combustion chamber 19 which is made spherical provides for oriented motion of the air swirl "B" therein. The tangential arrangement of the channel 24 in the direction of the air swirl "B" is conductive to maintaining a required ejection effect of the fuel jet "A", while this jet is being injected into a medium with high back compression, providing thereby for adequate removal of burnt gases from the precumbustion chamber.

Most of the full injected by the injector 8 through the nozzle 23 enters into the combustion chamber 19. The tangential arrangement of the nozzle 23 in relation to a wall of the combustion chamber 19 provides for the fuel flowing over the surface of said wall in the form of film which gradually evaporates. The fuel remaining in the precombustion chamber 22 is mixed with the hot air coming in via the channel 24, and, since there is no intensive turbulence by the end of the compression stroke, said fuel ignites spontaneously with a short period of induction prior to ignition of the fuel in the combustion chamber 19, said fuel being under conditions of intensive turbulence. As this takes place, pressure in the precombustion chamber 22 increases and the products of incomplete combustion of the rich precombustion chamber mixture are ejected in the form of a torch into the combustion chamber 19 in two directions via the channel 24 and the nozzle 23, ensuring quick combustion of fuel as it evaporates from the walls of the combustion chamber 19. The process of fuel combustion is accompanied by a moderate rise in pressure, while, at the same time, the chemically active torch provides for quick, complete and smokeless combustion up to stoichiometric ratio ($\alpha=1$) of the fuel-air mixture in the combustion chamber 19.

In accordance with this embodiment of the engine, it can operate on any type of liquid fuel with an optimum compression ratio E=11 to 14. For more reliable starting and part-load operation of the engine, expecially when fuels which are hard to ignite by compression, e.g. petrol, are used, ignition of the precombustion chamber mixture is initiated by a spark plug fitted in the combustion chamber 22.

The fuel-injection rotary-piston engine with prechamber-torch ignition according to the invention, operates as follows (FIG. 5 and 6).

Fuel is injected by the injector 8 by means of the fuel pump 9 via the precombustion chamber 27 and the nozzle 29 into the combustion chamber 28 in the course of compression of the air of fuel-air mixture. As this takes place the directed flow of air (or of fuel-air mixture) initiated by the rotor 26 causes an increase in the ejection effect of the fuel injected by the injector 8, thereby improving the degree of removal of burnt gases from the precombustion chamber 27. With a view to improving carburation and stratification of the mixture in the combustion chamber 28, it is expedient to feed a certain amount of fuel into a compression chamber 34 by means of an additional injector 33 coupled to the same section of the fuel pump 9. The latter precludes leakage of the fresh mixture, which normally is the case in conventional rotary-piston engines with carburation at the moment when the intake and exhaust strokes overlap.

After the precombustion mixture has been ignited by the spark plug 10, the chemically active precombustion chamber torches flow from the nozzle 29 and the channel 30, which permits igniting the mixture in the right and left portions of the combustion chamber 28 (see FIG. 6). In this way, substantial improvement of the operating economy of the engine and reduction of the toxicity of burnt gases are achieved.

To evaluate the efficiency of operation of the proposed engine, a single-cylinder engine was set up (cylinder diameter D =92 mm, piston stroke S=92 mm), which also made it possible to evaluate the efficiency of conventional engines with carburation and spark ignition, as well as with fuel injection into the inlet pipe and spark ignition.

Figure 7:
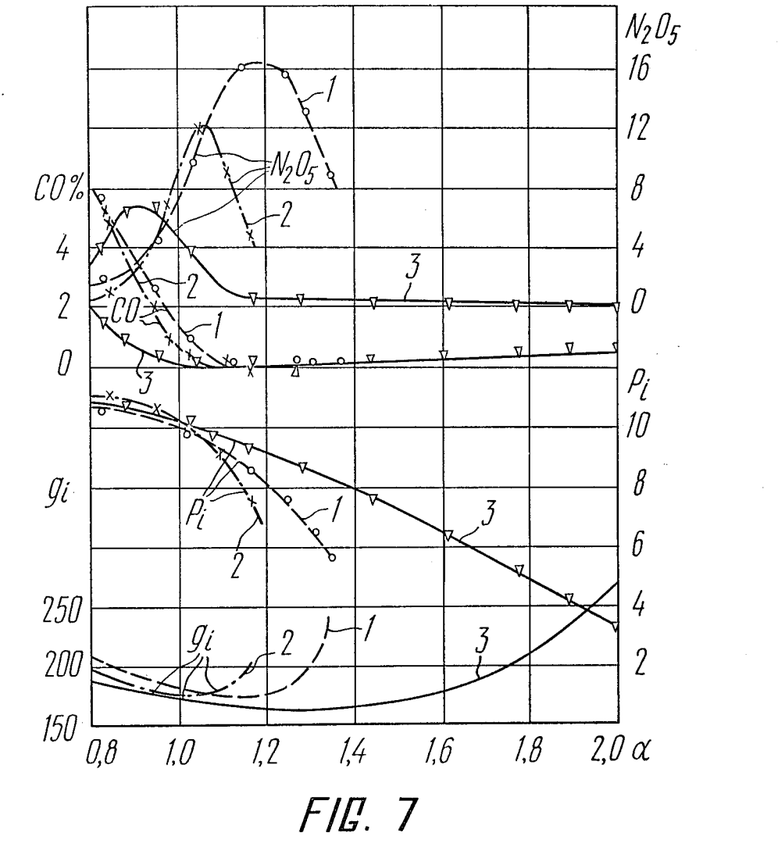
FIG. 7 shows the fuel-air mixture control characteristics of a single-cylinder fuel-injection engine with prechamber-torch ignition, according to the invention, versus those of engines with carburation and spark ignition, as well as engines with fuel injection into the inlet pipe and spark ignition.

FIG. 7 shows fuel-air control characteristics of a single-cylinder engine operating with carburation and spark ignition (curves 1), as well as with fuel injection into the inlet pipe and spark ignition (curves 2) versus the fuel-injection system according to the present invention with prechamber-torch ignition (curves 3). The characteristic curves were obtained, the engine operating on 76-octane petrol, the compression ratio in all cases being E=7.5. The combustion and precombustion chambers, according to the invention, were as in the second embodiment (FIGS. 2 and 3).

As can be inferred from FIG. 7, owing to specific features of the torch process, the limits of changing the mixture compostion corresponding to economic operation of the engine are $\alpha=1.0$ to $1.4+1.5$, whereas for carburation and spark ignition said limits are $\alpha=1.0$ to 1.2, and for engines with fuel injection into the inlet pipe and with spark ignition said limits are $\alpha=0.9+1.1$. The limits of lean mixtures corresponding to stable operation of an engine with spark ignition and in both cases of mixing, namely, carburation, and fuel injection, do not exceed $\alpha=1.2+1.3$, whereas in the case of fuel injection with prechamber-torch ignition, according to the invention, the limit of lean mixture can be $\alpha=2.0+2.1$, which corresponds to no-load operation of the engine as applied to a given speed (n=2.000 rpm).

Thus, in the engine according to the invention, the advantages of the prechamber-torch process, as far as efficient combustion of a lean fuel-air mixture is concerned, are fully realized.

The minimum indicated specific consumption of fuel with the throttle being fully open reaches, in the case of prechamber-torch ignition, $G_i=160$ g/HP.h, whereas in the case of carburation and fuel injection into the intake pipe, $G=175$ g/HP.h.

Owing to the fact that the air intake coefficient was maintained constant, the maximum value of the average indicated pressure ($P_i$) in all the described cases was almost the same.

The content of carbon monoxide (CO) in the exhaust gases with maximum power mixture ($\alpha=0.80+0.85$), in both cases of spark ignition, is sufficiently high. Owing to efficient ignition of the stratified working mixture with the aid of chemically active products of the precombustion chamber torch, the content of CO in the case of precombustion chamber torch, turned out to be three times lower under maximum power conditions, and the concentration thereof practically reaches zero already at $\alpha=1.05$, whereas in the case of spark ignition the liberation of CO stops only with $\alpha=1.1+1.15$.

One of important advantages of the proposed engine is the possibility of a sharp decrease in the concentration of nitrogen oxides in exhaust gases, said oxides, as is well known, being extremely noxious.

As is shown in FIG. 7, in the case of fuel injection with prechamber-torch ignition, maximum liberation of nitrogen oxides ($N_2O_5$) is observed when the engine developes maximum power (when $\alpha=0.9$), but not under most frequently used operating conditions. Therewith, maximum concentration of nitrogen oxides is more than twice as low as that in the case of carburation and spark ignition as well as in the case of fuel injection into the intake pipe with spark ignition. As the mixture becomes leaner, the content of $N_2O_5$ in the proposed engine sharply decreases and, in economical operation ($\alpha=1.2+1.6$), $N_2O_5$ is practically not liberated at all.

Said feature stems from the fact, that a relatively rich mixture distributed along the precombustion chamber torch, where the oxygen concentration is lower than that required for formation of $N_2O_5$, burns first. Subsequent burning of the formed products throughout the rest of the volume of the combustion chamber, which, depending on the stroke portion of injected fuel, contains either pure air or a very lean mixture, does not provide for the required temperature conditions for oxidation of nitrogen.

Based on the results of extensive studies on the single-cylinder engine, prototypes of an engine with a comprehensive system of fuel injection with prechamber-torch ignition were developed on the basis of a standard four cylinder carburator engine intended for the "Volga" passenger car.

Figure 8:
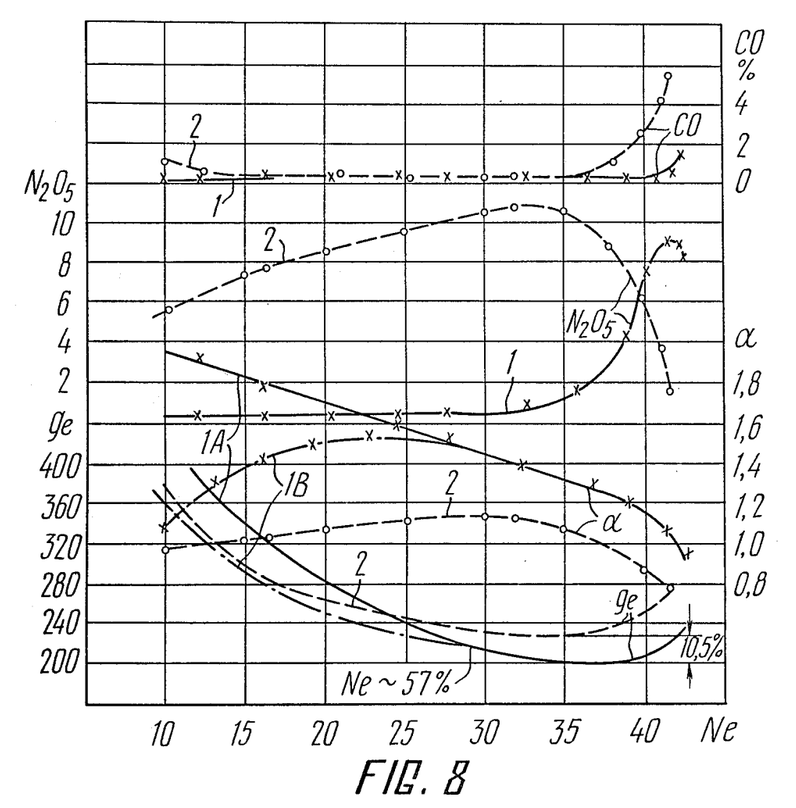
FIG. 8 shows load characteristic curves of a fuel-injection engine with prechamber-torch ignition, according to the invention, versus those of engines with carburation and spark ignition.

FIG. 8 shows load characteristic curves of the engine, according to the invention, comprising a combustion chamber and a precombustion chamber embodied in accordance with the schematic of FIG. 1 (curves 1).

Also shown for comparison are load characteristic curves of an engine with carburation and spark ignition (curves 2).

The graphs of effective specific fuel consumption ($G_e$) and excess air ratio ($\alpha$) for the case of fuel injection and precombustion chamber ignition are shown in FIG. 8, the effective power ($N_e$) being controlled by two methods: by changing the composition (curves IA) and quantity (curves IB) of the fuel-air mixture in the combustion chamber.

As can be seen from the graph, the proposed system of fuel injection and torch ignition allows for control of all load conditions of operation by changing only the quantity of the injected fuel, while the quantity of the intake air remains almost constant at a given speed. Therewith, not only is the system of control of operating conditions substantially simplified, but under main operating conditions of the engine the exhaust gases are practically free from the CO component, the volume of the liberated nitrogen oxides ($N_2O_5$) being but insignificant. Unlike an engine with carburation, the proposed engine is characterized by a maximum degree of liberation of $N_2O_5$ in full power operation. The process of liberation of CO also occurs under said conditions. That is why it would be most expedient to limit the enrichment of the working mixture to $\alpha=1.0+1.1$, because the toxicity of the exhaust gases is thereby substantially decreased. Therewith, the power loss amounts to no more than 6% and can be duly compensated for by increasing the air intake coefficient in the case of a system with fuel injection.

In the case of fuel injection and torch ignition, the fuel economy of the engine in terms of $G_{e\ min}$ is increased by 10.5%. High economy, when effecting power control by the method of changing the composition of the mixture (curves IA), is observed within the load range of 100 to 57%. As is seen from FIG. 8, with a view to maintaining high economy of the engine over the entire range of load conditions of operation, it is necessary to start throttling the intake air (curves IB). As this takes place, the excess air ratio decreases down to $\alpha=1.05$ only in the case of no-load operation, therefore, the degree of liberation of CO and $N_2O_5$ is similar to that in the first case of power control.

The above indicates that the prototype is characterized not only by that said engine can make use of the known advantages of both fuel injection and prechamber-torch ignition, but the processes of mixing in the precombustion chamber and control to the operating conditions are substantially simplified.

The results obtained so far, which are but preliminary initial and by no means complete, are convincing enough as to the fact that the novel system of fuel injection and prechamber-torch ignition makes it possible to develop a highly efficient and substantially less toxic automobile engine.

What is claimed is:

1. A fuel-injection internal combustion engine with prechamber-torch ignition, comprising: a combustion chamber, a precombustion chamber; at least one nozzle and at least one channel associated with said precombustion chamber, said nozzle and channel ensuring communication between said precombustion chamber and said combustion chamber; an injector, provided with at least one nozzle, said injector nozzle being arranged in said precombustion chamber and servicing for fuel feed during the process of injection into said precombustion chamber and into said combustion chamber; said precombustion chamber nozzle and said injector nozzle being arranged opposite to each other; said injector nozzle being disposed at a distance from said precombustion chamber nozzle, whereby during the injection process a jet of fuel enters said precombustion chamber nozzle, touching the inner surface thereof whereby the maximum volume of the cone fuel jet in said precombustion chamber constitutes 0.05 to 0.25 of the volume of said precombustion chamber; said volume of the cone fuel jet is the volume defined by "1" and "d" in the formula $V_1 = \frac{1}{3} \cdot (\pi d^2/4 \cdot 1)$, where 1 = the distance between the tip of said injector nozzle and said sectional area of said precombustion chamber nozzle where the fuel jet comes into contact; and d = the diameter of the nozzle of said precombustion chamber where the fuel jet comes into contact; and said channel serves to draw a fuel-air mixture into said precombustion chamber from said combustion chamber by the jet of fuel.

2. An internal-combustion engine as claimed in claim 1, wherein: the cross-sectional area of said channel is substantially equal to the cross-sectional area of the precombustion chamber nozzle.

3. An internal-combustion engine as claimed in claim 1, wherein: the outlet of the precombustion chamber nozzle is so arranged that it is overlapped with the piston head, when the latter is at the top dead center.

4. An internal-combustion engine ad defined in claim 1, wherein: said channel being disposed to have its end associated with the combustion chamber overlapped by the piston head when the latter is at the top dead center.

* * * * *